(12) United States Patent
Nakahara

(10) Patent No.: US 6,492,862 B2
(45) Date of Patent: Dec. 10, 2002

(54) CHARGE PUMP TYPE VOLTAGE CONVERSION CIRCUIT HAVING SMALL RIPPLE VOLTAGE COMPONENTS

(75) Inventor: Akihiro Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/785,737

(22) Filed: Feb. 16, 2001

(65) Prior Publication Data

US 2001/0017566 A1 Aug. 30, 2001

(30) Foreign Application Priority Data

Feb. 25, 2000 (JP) ...................................... 2000-049132

(51) Int. Cl.[7] .............................................. G05F 1/10
(52) U.S. Cl. ...................................................... 327/536
(58) Field of Search ................................ 327/530, 534, 327/535, 536, 537

(56) References Cited

U.S. PATENT DOCUMENTS

| | | | | |
|---|---|---|---|---|
| 5,034,625 A | * | 7/1991 | Min et al. | 327/536 |
| 5,969,565 A | * | 10/1999 | Naganawa | 327/536 |
| 6,278,316 B1 | * | 8/2001 | Tanzawa et al. | 307/110 |
| 6,285,622 B1 | * | 9/2001 | Haraguchi et al. | 327/536 |

FOREIGN PATENT DOCUMENTS

| | | | | |
|---|---|---|---|---|
| JP | 63-018958 A | 1/1988 | ............. | H02M/3/07 |
| JP | 63-018959 A | 1/1988 | ............. | H02M/3/07 |
| JP | 05-276737 A | 10/1993 | ............. | H02M/3/07 |
| JP | 06-165482 A | 6/1994 | ............. | H02M/3/07 |
| JP | 08-212781 A | 8/1996 | ......... | G11C/11/407 |
| JP | 11-187545 A | 7/1999 | ............. | H02G/3/16 |
| JP | 11-187645 A | 7/1999 | ............. | H02M/3/07 |

* cited by examiner

*Primary Examiner*—Jeffrey Zweizig
(74) *Attorney, Agent, or Firm*—Michael Best & Friedrich LLC; J. Warren Whitesel

(57) ABSTRACT

A charge pump type voltage conversion circuit comprises a voltage detector which detects whether a boosted output voltage is larger or smaller than a predetermined reference voltage. A clock generator generates a clock signal based on the result of detection by the voltage detector. A charge pump circuit produces the boosted output voltage in response to the clock signal. A transfer control circuit allows or inhibits transfer of the clock signal to the charge pump circuit depending on the result of detection by the voltage detector. When the condition of the transfer control circuit is changed from the inhibited condition to the allowed condition based on the clock signal outputted from the clock generator, an operation of the charge pump circuit always starts from a voltage boost sequence, thereby reducing a ripple components of the boosted output voltage.

14 Claims, 5 Drawing Sheets

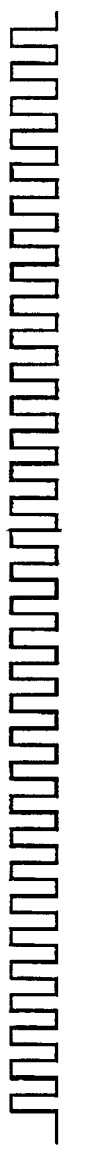
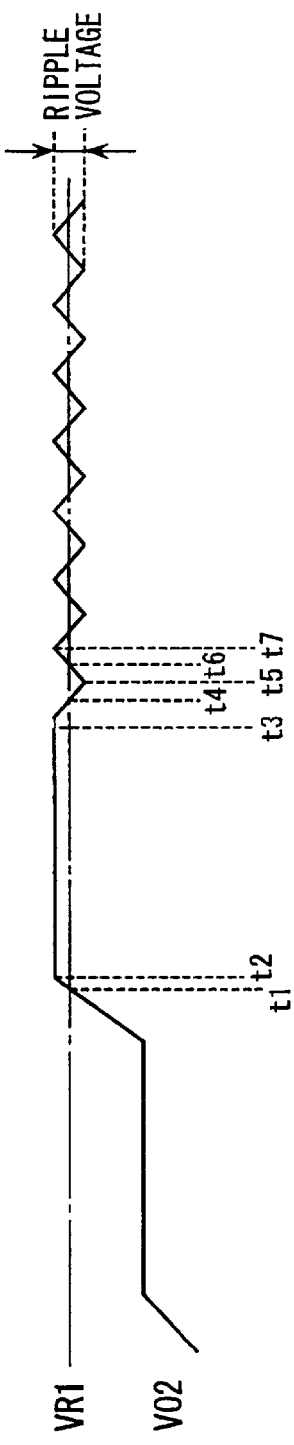
FIG. 2A LOAD CURRENT
FIG. 2B CLK SUPPLY OUT
FIG. 2C φ2
FIG. 2D φ1
FIG. 2E φ3 (φ4)
FIG. 2F VR1 / VO2

CHARGE PUMP TYPE VOLTAGE CONVERSION CIRCUIT HAVING SMALL RIPPLE VOLTAGE COMPONENTS

FIELD OF THE INVENTION

The present invention relates generally to a voltage conversion circuit, and more particularly to a charge pump type voltage conversion circuit which generates a boosted output voltage having reduced ripple voltage components.

BACKGROUND OF THE INVENTION

Conventional voltage conversion circuits are disclosed, for example, in Japanese patent laid-open publication No. 8-212781, Japanese patent laid-open publication No. 6-165482, Japanese patent laid-open publication No. 63-018958, Japanese patent laid-open publication No. 63-018959, Japanese patent laid-open publication No. 5-276737, and the like.

The voltage conversion circuits described in these publications are used for obtaining a positive or negative output voltage which has a larger magnitude than that of a power supply voltage, from a single power supply voltage. Otherwise, the voltage conversion circuits described in these publications are used for obtaining an output voltage which has a smaller magnitude than that of a power supply voltage, from a single power supply voltage.

In order to compose such voltage conversion circuit on a printed circuit board, there is used a three terminal-type voltage regulator, a switching regulator which uses a coil component, or the like. However, the three terminal-type voltage regulator has a disadvantage that a power loss by a transistor of an output circuit stage thereof becomes large. Also, although a power loss of the switching regulator is relatively smaller than that of the three terminal-type voltage regulator, the switching regulator has a disadvantage that the size of the device becomes large because it uses a coil component.

In order to avoid the above-mentioned disadvantages, when, for example, a voltage conversion circuit is to be formed on an semiconductor integrated circuit device, a charge pump-type voltage conversion circuit is used. The charge pump-type voltage conversion circuit has the merits of low power loss, good compatibility with a semiconductor integrated circuit in a manufacturing process thereof, and the like.

As an example, a voltage conversion circuit outputting a positive voltage is used in a power supply circuit portion in an integrated circuit of an RS-232C (interface standard) driver/receiver, and the like. Also, a voltage conversion circuit outputting a negative voltage is used in a power supply circuit for a negative voltage source of an operational amplifier or a comparator, and the like.

Each of these voltage conversion circuits has a voltage conversion portion composed of a switched capacitor circuit which comprises switches and capacitors and which operates based on a clock signal supplied from a clock generator portion.

As another example, in Japanese patent laid-open publication No. 11-187545, there is disclosed a circuit structure which has a function of enabling or disabling a voltage raising operation, depending on whether or not a voltage corresponding to the difference between an output of a charge pump and a power supply voltage exceeds a reference voltage.

However, in such circuit structure, when a load is connected to an output terminal thereof, a relatively large voltage ripple arises at the output terminal due to the influence by the electric charges consumed by the load, and it is impossible to make an influence of such voltage ripple small.

With reference to the drawing, an explanation will be made on a practical example of a conventional voltage conversion circuit.

FIG. 5 is a circuit diagram illustrating an example of a conventional voltage conversion circuit. As shown in FIG. 5, the voltage conversion circuit includes a voltage detector circuit 1, a clock oscillator circuit 2a, a latch circuit 3, a charge pump circuit 4a, and a compensation capacitor CL. The voltage detector circuit 1 is a circuit which compares a divided output voltage VO2 of a boosted voltage output VO1 with a reference voltage VR1, and outputs a voltage detection signal $\phi 1$ depending on the result of the comparison. The clock oscillator circuit 2a performs a controlled oscillation operation in response to the voltage detection signal $\phi 1$, and outputs a clock signal $\phi 2$. The latch circuit 3 latches the clock signal $\phi 2$ outputted from the clock oscillator circuit 2 in response to the voltage detection signal $\phi 1$ from the voltage detector circuit 1. The charge pump circuit 4a charges capacitor elements C1 and C2 in response to the output signal of the latch circuit 3, and produces the boosted voltage output VO1. The compensation capacitor CL is coupled between the output terminal and the ground.

Also, the voltage detector circuit 1 comprises a comparator 11 for comparing the reference voltage VR1 and the divided voltage VO2 of the boosted voltage output VO1, and resistors R1 and R2 for producing the divided voltage VO2. These resistors R1 and R2 are serially coupled between the boosted voltage output VO1 and the ground, and the connection node between the resistor R1 and the resistor R2 is coupled with an inverting input (−side) of the comparator 11. A non-inverting input (+side) of the comparator 11 is coupled with the reference voltage VR1. When the divided voltage VO2 obtained by dividing the boosted voltage output VO1 is lower than the reference voltage VR1, the voltage detection signal $\phi 1$ which is an output of the comparator 11 becomes logically high. On the other hand, when the divided voltage VO2 is higher than the reference voltage VR1, the voltage detection signal $\phi 1$ becomes logically low.

The clock oscillator circuit 2a is basically composed of a ring oscillator comprising inverters I2–I4. An output of the inverter I4 of the final stage is fed back to an input of the inverter I2 of the first stage, via a transfer gate TG1 comprising an n-type MOS transistor and a p-type MOS transistor. Other inverters I5 and I6 designate output buffers for outputting the clock signal $\phi 2$. TG1 designates the transfer gate, Q1 designates a MOS switch, I1 designates an inverter for controlling the MOS switch Q1 and the transfer gate TG1. Since there exist parasitic capacitances C3–C5 at respective nodes in the ring oscillator having the above-mentioned structure, signal transition at each of the nodes becomes dull or blunted. Therefore, the clock oscillator circuit 2a requires buffering for wave shaping.

In the clock oscillator circuit 2a, the transfer gate TG1 is on-off controlled by the voltage detection signal $\phi 1$ generated depending on the potential level of the boosted voltage output VO1. The transfer gate TG1 becomes conductive only when the signal $\phi 1$ is logically high, and causes the ring oscillator circuit to oscillate and output the clock signal $\phi 2$ as an output thereof. On the other hand, when the voltage detection signal φ1 is logically low, an input node N1 of the inverter 12 is clamped to low by the inverter I1 and the transistor Q1, and fix the potential level of the clock signal φ2 to logically high. Generally, when an operation of a ring oscillator circuit is to be stopped, an input node is clamped to a low potential level or a high potential level, as in this circuit example, to avoid a floating condition of a potential level of each circuit node.

The latch circuit 3 has a transfer gate TG2 composed of an n-type MOS transistor and a p-type MOS transistor, an inverter I14, and clocked inverters I15 and I16. The transfer gate TG2 is controlled by the voltage detection signal φ1 from the voltage detector circuit 1. When the voltage detection signal φ1 is in a high potential level, that is, when the divided voltage VO2 produced from the boosted voltage output VO1 is lower than the reference voltage VR1, the transfer gate TG2 is turned on. When the voltage detection signal φ1 is in a low potential level, that is, when the divided voltage VO2 produced from the boosted voltage output VO1 is higher than the reference voltage VR1, the transfer gate TG2 is turned off. When the voltage detection signal φ1 becomes a low potential level, that is, when the transfer gate TG2 is turned off, the latch circuit 3 latches the clock signal φ2 of the clock oscillator circuit 2a just before turning off of the transfer gate TG2, by using the clocked inverters I15 and I16.

In the charge pump circuit 4a, the clock signal φ2 from the clock oscillator circuit 2a latched by the latch circuit 3 is converted into a pair of internal clock signals φ3 and φ4 which are complementary to each other, by inverters I7, I8 and I9. These internal clock signals φ3 and φ4 charge capacitance elements C1 and C2, respectively, and produce the boosted voltage output VO1. In the charge pump circuit 4a, the internal clock signals φ3 and φ4 have the phases which are inverted from each other, and the charge pump circuit 4a constitutes a complementary type circuit. MOS transistors Q2–Q5 constitute a circuit which functions as a buffer for delivering charged voltages of the capacitors C1 and C2 into the boosted voltage output VO1.

An explanation will now be made on an operation of the above-mentioned voltage conversion circuit. When a load circuit, for example, an operational amplifier, not shown in the drawing, is coupled to the line of the boosted output voltage VO1 and consumes an electric power, the boosted output voltage VO1 decreases, so that the divided voltage VO2 becomes lower than the reference voltage VR1. In such case, the voltage detection signal φ1 becomes logically high potential level, and the clock oscillator circuit 2a performs an oscillation operation and produces the clock signal φ2. When the clock signal φ2 is produced, the charge pump circuit 4a operates in a complementary manner and performs a voltage boost operation to produce the boosted output voltage VO1 which is supplied to the output terminal.

When the voltage VO1 at the output terminal raises and the divided voltage VO2 becomes higher than the reference voltage VR1, the voltage detection signal φ1 of the voltage detector circuit 1 becomes logically low, and the clock oscillator circuit 2a stops oscillation and, thereby, a voltage boosting operation of the charge pump circuit 4a is also stopped. As a result thereof, the rise of the boosted output voltage VO1 of the charge pump circuit 4a ceases. That is, the output voltage VO1 is maintained at a high potential level determined based on the reference voltage VR1, with a certain range of voltage variation centered around the high potential level (the width of this variation is called a ripple voltage).

Usually, it is desirable that the ripple voltage of the boosted output voltage VO1 is as small as possible. As one of the conventional methods of reducing the ripple voltage, when the divided voltage VO2 obtained by dividing the boosted output voltage VO1 becomes higher than the reference voltage VR1 and the voltage detection signal φ1 becomes low, operation of the charge pump circuit 4a is stopped as soon as possible. Also, when the divided voltage VO2 obtained by dividing the boosted output voltage VO1 becomes lower than the reference voltage VR1 due to the power consumption of the load circuit and the like and the voltage detection signal φ1 becomes high, operation of the charge pump circuit 4a is resumed as soon as possible. Thereby, the ripple voltage of the boosted output voltage VO1 is suppressed to a small value.

However, the above-mentioned conventional voltage conversion circuit has the following problems.

As the first problem, in the conventional voltage conversion circuit, the complementary type charge pump circuit is used and, therefore, two capacitors are required. Also, in order to suppress the ripple voltage, it is necessary to use elements each having large capacitance value. Therefore, number and volume of parts required in the charge pump circuit become large. Especially, the sizes of such capacitors are too large to incorporate into a semiconductor substrate, and usually such capacitors are provided as discrete parts disposed outside a semiconductor integrated circuit. Thus, when a voltage conversion circuit having a complementary type charge pump circuit is to be constituted, number of parts provided outside the semiconductor integrated circuit increases, and costs of the voltage conversion circuit also becomes large.

As the second problem, in case a non-complementary type charge pump circuit is used in place of the complementary type charge pump circuit, a magnitude of a ripple voltage becomes approximately twice as large as that of the complementary type charge pump circuit. The reason for this is as follows. When an operation of the clock oscillator circuit is to be halted, the clock signal just before halting the operation is latched. Therefore, when the next oscillation operation is restarted, the non-complementary type charge pump circuit does not always start operation from a voltage boosting operation.

As the third problem, since the potential level of the reference voltage is determined based on the power supply voltage, the potential level of the reference voltage may vary depending on variations of the potential level of the power supply voltage, and variations of the potential level of the reference voltage directly appear at the output terminal as variations of the boosted output voltage.

As the fourth problem, in the conventional voltage conversion circuit, it is always necessary to build the clock oscillator circuit into the semiconductor substrate and, therefore, the conventional voltage conversion circuit has disadvantages in a chip area, precision of a clock signal frequency, power consumption and the like. This is because, in the conventional voltage conversion circuit, when the potential level of the boosted output voltage reaches a predetermined potential level, an input or output node of the clock oscillator circuit is clamped to a low potential level or a high potential level to avoid a potential floating condition of each node of the clock oscillator circuit.

SUMMARY OF THE INVENTION

Therefore, it is an object of the present invention to obviate the disadvantages of the conventional voltage conversion circuit.

It is another object of the present invention to provide a voltage conversion circuit in which the number of parts can be decreased.

It is still another object of the present invention to provide a voltage conversion circuit in which the magnitude of a ripple voltage can be reduced.

It is still another object of the present invention to provide a voltage conversion circuit in which variations of a potential level of a reference voltage does not appear at an output terminal as variations of a boosted output voltage.

It is still another object of the present invention to provide a voltage conversion circuit in which it is possible to reduce ripple voltage components, even without building a clock oscillator circuit into a semiconductor substrate.

A voltage conversion circuit according to the present invention basically comprises: a detector means for detecting whether a boosted output voltage is larger or smaller than a predetermined reference voltage; a clock generating means for producing a second clock signal based on the result of detection by the detector means and on a first clock signal; a charge-pump type voltage conversion means which produces the boosted output voltage in response to the second clock signal; and a transfer means which allows or inhibits transfer of the second clock signal that is an output of the clock generating means to the voltage conversion means depending on the result of voltage detection by the detection means.

Also, in the present invention, when the condition of the transfer means is changed from the inhibited condition to the allowed condition based on the second clock signal outputted from the clock generating means, an operation of the voltage conversion means starts from a voltage boost sequence.

Further, in the present invention, it is not always necessary that the first clock signal is generated from the clock oscillator circuit on a semiconductor substrate, but it may be supplied from outside of the semiconductor substrate. Also, the second clock signal is obtained by dividing the first clock signal by using a divider circuit.

In an operation of such voltage conversion circuit, there is used a transfer circuit which is disposed between the clock generating circuit and the charge pump circuit and which is on-off controlled depending on the result of detection by the voltage detector circuit. Thereby, on and off of the operation of the charge pump circuit is controlled immediately in response to the result of voltage detection.

Especially, when the voltage detector circuit detects that the boosted output voltage is higher than a predetermined reference voltage, the transfer circuit is immediately turned off and prevents the second clock signal outputted from the clock generating circuit from being transferred to the charge pump circuit. Also, when the voltage detector circuit detects that the boosted output voltage is lower than the predetermined reference voltage, the transfer circuit is immediately turned on and transfers the second clock signal outputted from the clock generating circuit to the charge pump circuit.

The second clock signal transferred to the charge pump circuit is produced by dividing the first clock signal supplied from an oscillator circuit, which is arranged on a semiconductor substrate or outside of the semiconductor substrate, by using a divider circuit. In this case, when the voltage detector circuit detects that the boosted output voltage is higher than the predetermined reference voltage, the divider circuit becomes a reset condition. When the voltage detector circuit detects that the boosted output voltage is lower than the predetermined reference voltage, the divider circuit immediately starts a dividing operation of the first clock signal. Thereby, the timing of the second clock signal is controlled such that the charge pump circuit always starts operation from the voltage boost sequence.

Additionally, the reference voltage of the voltage detector circuit is determined based on an output of a reference voltage supply circuit which is less dependent on a power supply voltage and a temperature. Thereby, the variation of the output voltage caused by the variation of the reference voltage can be reduced.

According to an aspect of the present invention, there is provided a voltage conversion circuit comprising: a voltage detector means which detects whether a boosted output voltage of the voltage conversion circuit is larger or smaller than a predetermined reference voltage; a clock generating means which generates a clock signal based on the result of detection by the voltage detector means; a charge-pump type voltage conversion means which produces the boosted output voltage in response to the clock signal; and a transfer control means which allows or inhibits transfer of the clock signal to the voltage conversion means depending on the result of detection by the voltage detector means; wherein, when the condition of the transfer control means is changed from the inhibited condition to the allowed condition based on the clock signal outputted from the clock generating means, an operation of the voltage conversion means starts from a voltage boost sequence.

In this case, it is preferable that the transfer control means comprises a logic gate which receives the clock signal and a voltage detection signal showing the result of detection of the voltage detector means.

It is also preferable that the logic gate is an OR gate.

It is further preferable that the clock generating means comprises a divider circuit which divides an input clock signal supplied thereto and which is resettable based on the voltage detection signal from the voltage detector circuit.

According to another aspect of the present invention, there is provided a voltage conversion circuit comprising: a voltage detector circuit which detects whether a boosted output voltage of the voltage conversion circuit is larger or smaller than a predetermined reference voltage and which outputs a voltage detection signal depending on the result of detection; a clock oscillator circuit which has a divider circuit for dividing a first clock signal inputted thereto to generate a second clock signal and which has a reset circuit for resetting the divider circuit based on the voltage detection signal from the voltage detector circuit; a logic gate which perform logical operation of the second clock signal from the clock oscillator circuit and the voltage detection signal from the voltage detector circuit; and a charge-pump circuit which comprises a capacitor and switch circuit for charging the capacitor based on an output of the logic gate and which produces the boosted output voltage;

In this case, it is preferable that, when the boosted output voltage of the voltage conversion circuit becomes larger than the predetermined reference voltage, the charge pump circuit starts operation from a voltage boost sequence.

It is also preferable that the logic gate is an OR gate.

It is further preferable that the first clock signal is supplied by a clock supply circuit comprising an odd number of inverters coupled to form a ring oscillator and a buffer circuit coupled to the output of the ring oscillator.

It is advantageous that the divider circuit comprises a plurality of tandem coupled flip-flops which count the first clock signal to generate the second clock signal and which are resettable by the reset circuit.

It is also advantageous that the reset circuit resets the divider circuit based on an external reset signal or on the voltage detection signal from the voltage detector circuit.

It is further advantageous that the charge pump circuit is a non-complementary type charge pump circuit.

It is preferable that the voltage detector circuit comprises a comparator and a voltage divider circuit, the comparator receiving a divided voltage from the voltage divider circuit and a reference voltage supplied by a bandgap reference circuit.

It is also preferable that the voltage detector circuit comprises a comparator, an operational amplifier and a voltage divider circuit for dividing an output signal of the operational amplifier and supplying a divided voltage from the voltage divider circuit to an input of the comparator, the comparator and the operational amplifier receiving reference voltages each supplied by a bandgap reference circuit.

It is further preferable that the first clock signal is supplied to the clock oscillator circuit by a clock supply circuit disposed outside of a semiconductor integrated circuit including at least a portion of the voltage conversion circuit.

It is advantageous that the first clock signal is supplied to the clock oscillator circuit by a clock supply circuit integrated on a semiconductor substrate including at least a portion of the voltage conversion circuit.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which:

FIGS. 2A through 2F are timing diagrams showing signal waveforms of various portions of the voltage conversion circuit of FIG. 1;

DESCRIPTION OF A PREFERRED EMBODIMENT

With reference to the drawings, embodiments of the present invention will now be described in detail.

Figure 1:
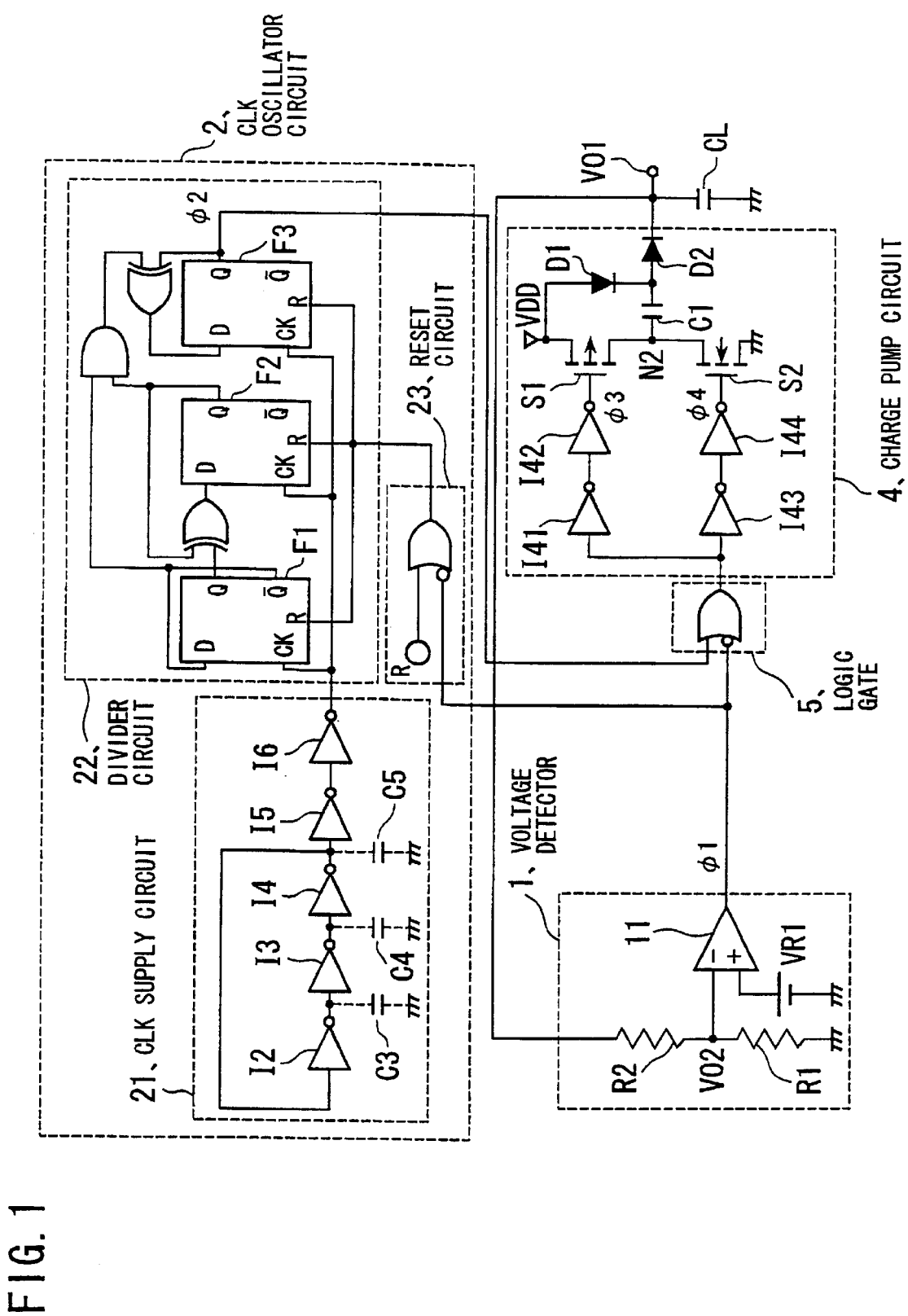
FIG. 1 is a circuit diagram illustrating a voltage conversion circuit according to the first embodiment of the present invention.
Figure 5:
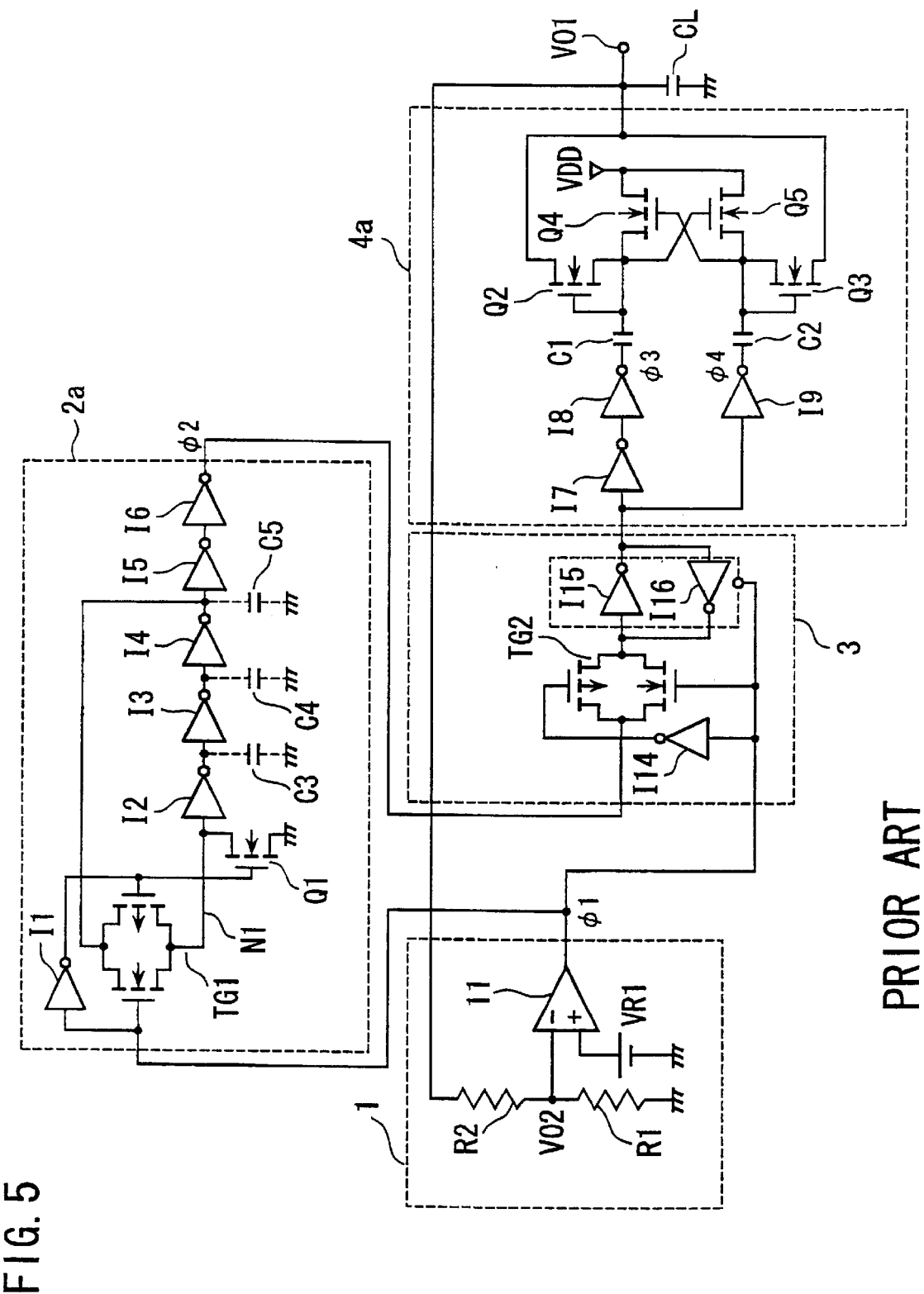
FIG. 5 is a circuit diagram illustrating a conventional voltage conversion circuit.

FIG. 1 shows a voltage conversion circuit according to the first embodiment of the present invention. As shown in FIG. 1, in this embodiment, whole the voltage conversion circuit is formed on the same semiconductor substrate. However, the voltage conversion circuit can also be constituted by using discrete components or separate circuit blocks, and, in such case, it is also possible to integrate portion or portions of the voltage conversion circuit on other one or more semiconductor substrates. In FIG. 1, portions similar to those of the circuit of FIG. 5 are designated by the same reference numerals and symbols.

As shown in FIG. 1, the voltage conversion circuit according to this embodiment comprises a voltage detector circuit 1, a clock oscillator circuit 2, a logic gate 5, a charge pump circuit 4, and a compensation capacitor CL. The voltage detector circuit 1 is a circuit which compares a divided output voltage VO2 obtained by dividing a boosted output voltage VO1 with a reference voltage VR1, and outputs a voltage detection signal φ1 depending on the result of the comparison. The clock oscillator circuit 2 performs controlled oscillation operation in response to the voltage detection signal φ1, and outputs a clock signal φ2. The logic gate 5 controls a transfer of the clock signal φ2 outputted from the clock oscillator circuit 2 in response to the voltage detection signal φ1 from the voltage detector circuit 1. The charge pump circuit 4 charges a capacitor C1 in response to the output signal of the logic circuit 5, and produces the boosted output voltage VO1. The compensation capacitor CL is coupled between the output terminal and the ground.

Also, the voltage detector circuit 1 comprises a comparator 11 for comparing the reference voltage VR1 and the divided voltage VO2 of the boosted output voltage VO1, and resistors R1 and R2 for producing the divided voltage VO2 from the boosted output voltage VO1. These resistors R1 and R2 are serially coupled between the boosted output voltage VO1 and the ground, and the connection node between the resistor R1 and the resistor R2 is coupled with an inverting input (−side) of the comparator 11. A non-inverting input (+side) of the comparator 11 is coupled with the reference voltage VR1. It is preferable that the reference voltage VR1 is supplied from a stabilized power source such as a bandgap referenced circuit integrated on the same semiconductor substrate. It is also possible to supply the reference voltage VR1 from a stable power source outside the semiconductor substrate.

The clock oscillator circuit 2 is basically composed of a clock supply circuit 21, a divider circuit 22 and a reset circuit 23. The clock supply circuit 21 basically has a ring oscillator structure. The ring oscillator comprises inverters I2–I4 which are cascaded or coupled in tandem. An output of the inverter I4 of the final stage is fed back to an input of the inverter I2 of the first stage. Other inverters I5 and I6 are output buffers. Since, as shown in the drawing, there exists parasitic capacitance C3–C5 at respective nodes in the ring oscillator having the above-mentioned structure, signal transition at each of the nodes becomes dull or blunted. Therefore, the clock oscillator circuit 2 requires buffering for wave shaping.

In the above-mentioned embodiment, the clock supply circuit 21 is integrated on the semiconductor substrate. However, it is also possible to supply a necessary clock signal from outside by using, for example, a crystal oscillator and the like.

The divider circuit 22 is composed, for example, of an octal synchronous counter having three delay flip-flop (D-type flip-flop) circuits F1–F3. To a clock terminal CK of each of the D-type flip-flops F1–F3, there is supplied the output clock signal from the clock supply circuit 21. In the D-type flip-flop F1 of the first stage, an inverted output Q-bar is fed-back to a data input terminal D. In each of the D-type flip-flops F2 and F3 of the second and third stages, a non-inverted output Q is fed-back to a data input terminal D via a logic circuit, for example, an exclusive OR circuit.

The reset circuit 23 comprises an OR circuit which receives as inputs a reset signal R from an external circuit not shown in the drawing and an inverted signal of the voltage detection signal φ1 of the voltage detector circuit 1. An output signal of the OR circuit, that is, an output signal of the reset circuit 23, is supplied to reset terminals R of the D-type flip-flops F1–F3.

The transfer circuit 5 comprises an OR circuit which receives as inputs an inverted signal of the voltage detection signal φ1 of the voltage detector circuit 1 and a clock signal φ2 that is an output of the clock oscillator circuit 2. An output signal of the OR circuit, that is, an output signal of the transfer circuit 5, is supplied to the charge pump circuit 4.

In the charge pump circuit 4, a first switch S1 and a second switch S2 are formed of a p-type MOS transistor and an n-type MOS transistor, respectively, which are serially coupled between a power supply voltage VDD and the ground. One of terminals of a capacitor C1 is coupled to a common connection node of the switches S1 and S2. The other terminal of the capacitor C1 is coupled to the power supply voltage VDD via a diode D1 and is also coupled, via a diode D2, to an output terminal VO1 from which the boosted output voltage VO1 is outputted. It is possible to form these diodes D1 and D2 by using MOS transistors similarly to the switches S1 and S2. The charge pump circuit 4 also has inverters I41 through I44 which produce, from the clock signal φ2, clock signals φ3 and φ4 as drive signals supplied to the switches S1 and S2, respectively. The clock signals φ3 and φ4 have duty cycles such that on-times of the switches S1 and S2 do not overlap with each other, in order to avoid simultaneous turning on of the switches S1 and S2.

The charge pump circuit 4 in this embodiment is, as an example, a non-complementary type charge pump circuit. When the charge pump circuit 4 of this embodiment is compared with the conventional complementary type charge pump circuit shown in FIG. 5, the number of a capacitor element required by the charge pump circuit 4 of this embodiment is less than that of the charge pump circuit of FIG. 5 by one. Also, in this embodiment, the switches S1 and S2 are constituted of the MOS transistors, and in the above it is described that the diodes D1 and D2 can also be formed of MOS transistors. However, these switches and diodes can be realized by using other elements which have similar switching function, such as bipolar transistors, DMOS transistors and the like.

Further, in the above-mentioned voltage conversion circuit according to this embodiment, the charge pump circuit 4 performs a voltage boost operation based on two phase clock signals. However, the voltage conversion circuit may comprise a charge pump circuit which performs a voltage boost operation based on multi-phase clock signals, and a clock oscillator circuit for supplying the multi-phase clock signals to such charge pump circuit. Also, in the above-mentioned voltage conversion circuit according to this embodiment, the non-complementary type charge pump circuit produces a positive boost voltage. However, the voltage conversion circuit may comprise various types of charge pump circuits which produce a negative boost voltage, a positive reduced voltage and the like.

Now, a schematic explanation will be made on an operation of the above-mentioned voltage conversion circuit.

First, when a power supply is turned on, the reset circuit 23 receives the reset signal R from, for example, a power-on reset circuit, a power supply monitor circuit and the like formed on the same semiconductor substrate not shown in the drawing. In response to the reset signal R, the reset circuit 23 initializes the flip-flops F1 through F3 of the divider circuit 22.

Here, when the divided voltage VO2 is lower than the reference voltage VR1, the detection output signal φ1 of the voltage detector circuit 1 becomes logically high, and on the other hand, when the divided voltage VO2 is higher than the reference voltage VR1, the detection output signal φ1 of the voltage detector circuit 1 becomes logically low. Therefore, when the divided voltage VO2 is lower than the reference voltage VR1, the reset circuit 23 outputs a low level signal. Thus, the divider circuit 22 is released from the reset condition, and the logic gate 5 as a transfer circuit allows the clock signal φ2 to pass to the charge pump circuit 4. The counter circuit of the divider circuit 22 divides an internal clock signal produced by the clock supply circuit 21 by eight to produce the clock signal φ2 having a period which is eight times longer than that of the internal clock signal, and the clock signal φ2 is supplied to the charge pump circuit 4.

On the other hand, the charge pump circuit 4 produces the clock signals φ3 and φ4 from the clock signal φ2 by the inverters I41–I44, and supplies the clock signals φ3 and φ4 to the switches S1 and S2, respectively. During time periods in which these clock signals φ3 and φ4 are logically high, the switch S1 is in a turned-off condition, and the switch S2 is in a turned-on condition. In such condition, a voltage is outputted from the output terminal of the charge pump circuit 4 which voltage is lower than the power supply voltage VDD by the voltage drop caused by the diodes D1 and D2. Also, the capacitor C1 is charged approximately to the power supply voltage VDD via the diode D1. During time periods in which these clock signals φ3 and φ4 are logically low, the switch S1 is in a turned-on condition, and the switch S2 is in a turned-off condition. In such condition, one of the terminals of the capacitor C1, that is, a node N2, is coupled to the power supply voltage VDD via the switch S1. Thereby, the compensation capacitor CL is charged to a voltage higher than the power supply voltage VDD and, therefore, the boosted output voltage VO1 having a voltage higher than the power supply voltage VDD is outputted.

In this way, the charge pump circuit 4 performs a voltage boost operation, and when the divided voltage VO2 becomes higher than the reference voltage VR1, that is, when the detection signal output φ1 becomes low, the reset circuit 23 outputs a logically high output signal and resets the divider circuit 22. Also, the logic gate 5 as a transfer circuit outputs a logically high output signal, and inhibit the clock signal φ2 from being supplied to the charge pump circuit 4.

By the operation mentioned above, the charge pump circuit 4 outputs the boosted output voltage VO1 on the basis of the reference voltage VR1. The charge pump circuit 4 can output the boosted output voltage VO1 having a potential level between one and two times of the potential level of the power supply voltage VDD.

Also, in this embodiment, the reference voltage VR1 is constituted by using the bandgap reference type circuit which has little dependence on the temperature and the power supply voltage VDD. Therefore, variation of the boosted output voltage VO1 caused by the variation of the power supply voltage can be very small.

Summarizing the above-mentioned operation, when a load of the boosted output voltage VO1, such as an operational amplifier, which is coupled to the boosted output terminal and which is not shown in the drawing consumes a power, the boosted output voltage VO1 falls. In response thereto, the divided voltage VO2 also falls and becomes lower than the reference voltage VR1. Therefore, the voltage detection signal φ1 for controlling an oscillation of the clock oscillator circuit 2 becomes high, and the clock oscillator circuit 2 generates the clock signal φ2. Thereby, the charge pump circuit 4 operates and boosts the boosted output voltage VO1. When the divided voltage VO2 becomes higher than the reference voltage VR1, the voltage detection signal φ1 becomes low. Thus, the divider circuit 22 becomes a reset condition and the voltage boost operation of the charge pump circuit 4 is halted. Therefore, a voltage rise of the boosted output voltage VO1 is also stopped. That is, the boosted output voltage VO1 is maintained at a high voltage whose central value is determined based on the reference voltage VR1 and which has a voltage variation within a certain width, that is, a ripple voltage.

As mentioned above, the conventional complementary type charge pump circuit always starts operation from a voltage boost operation regardless of whether the potential level of the clock signal supplied to the charge pump circuit is high or low. On the other hand, in this embodiment, by using the non-complementary type charge pump circuit 4, the boosted output voltage VO1 is boosted only when the internal clock signal φ3 is in a low potential level and also the internal clock signal φ4 is in a low potential level.

That is, in the clock oscillator circuit 2 according to this embodiment, when the divided voltage VO2 becomes higher than the reference voltage VR1, the divider circuit 22 is fixed to a reset condition, and when the divided voltage VO2 becomes lower than the reference voltage VR1, the charge pump circuit 4 always starts operation from the voltage boost sequence of the boosted output voltage VO1. Therefore, when the divided voltage VO2 becomes higher than the reference voltage VR1 and a supply of the clock signal φ2 to the charge pump circuit 4 is halted, the clock supply circuit 21 can retain an oscillating condition. Thereby, in the voltage conversion circuit according to the present embodiment, it is possible to reduce ripple voltage components appearing on the boosted output voltage VO1, by supplying the clock signal to the non-complementary type charge pump circuit 4 in a manner mentioned above.

With reference to signal waveform diagrams of FIGS. 2A–2F, a detailed circuit operation of the above-mentioned voltage conversion circuit will now be described.

FIGS. 2A–2F are timing diagrams of the signals of various portions of the voltage conversion circuit shown in FIG. 1. As shown in FIGS. 2A–2F, after the power supply voltage VDD is supplied and until time t1, the boosted output voltage VO1 is not yet boosted to an aimed output potential level, and the voltage detection signal φ1 is in a high potential level. Therefore, the divider circuit 22 counts the output clock signal from the clock supply circuit 21 and produces the clock signal φ2. In case the divider circuit 22 is composed of a 3-bit counter, the divider circuit 22 produces a clock signal φ2 whose half period corresponds to the count of four outputs, i.e., four pulses, of the clock supply circuit 21 by the 3-bit counter. Since the voltage detection signal φ1 outputted from the comparator 11 is in a high potential level, the logic gate 5 is in a condition in which the clock signal φ2 is transferable to the charge pump circuit 4. Thus, the charge pump circuit 4 performs the voltage boost operation according to the clock signal φ2. In this case, there is an operational delay in the circuit from the output of the comparator 11 through the logic gate 5 and the charge pump circuit 4 to the input of the comparator 11, especially in the charge pump circuit 4. Therefore, even when, at the time t1, the boosted output voltage VO1 reaches the aimed output voltage which is determined based on the reference voltage VR1, the logical potential of the output φ1 of the comparator 11 does not invert immediately.

After elapsing such circuit delay time, at time t2, the output φ1 of the comparator 11 inverts and becomes low potential level. The divider circuit 22 is reset and the supply of the clock signal φ2 to the charge pump circuit 4 is stopped. As a result thereof, when the charge pump circuit 4 resumes operation next time, the clock signal φ2 is in a low potential level and the switch S1 is operated by the clock signal φ3 and, therefore, the charge pump circuit 4 starts operation from the voltage boost sequence of the boosted output voltage VO1.

Next, at time t3, a load current flows into a load which is coupled to the output terminal and which is not shown in the drawing. By such load current, electric charges stored in the capacitor CL are reduced, and the boosted output voltage VO1 is lowered.

At time t4, the boosted output voltage VO1 becomes lower than the aimed output voltage which is determined based on the reference voltage VR1. However, the voltage detection signal φ1 output from the comparator 11 cannot invert immediately because of the above-mentioned circuit delay. Some time after, at time t5, the voltage detection signal φ1 rises from a low potential level to a high potential level. Thereby, the logic gate 5 allows the clock signal φ2 to pass to the charge pump circuit 4. However, the divider circuit 22 is counting the output of the clock supply circuit 21 and, therefore, the clock signal φ2 is at a low potential level. Therefore, the logic gate 5 supplies an inverted signal of the voltage detection signal φ1, that is, a signal of low potential level, to the charge pump circuit 4. That is, since the inverted signal of the voltage detection signal φ1 is at a low potential level, the charge pump circuit 4 performs the voltage boost operation.

At time t6, the boosted output voltage VO1 becomes larger than the aimed output voltage determined based on the reference voltage VR1, that is, the divided voltage VO2 becomes higher than the reference voltage VR1. Shortly thereafter, because of the circuit delay, the voltage detection signal φ1 from the comparator 11 inverts at time t7.

Thereafter, during a time period a load current flows, the above-mentioned operation is repeated.

In summary, during a period in which no load current flows, the clock signal φ2 having a constant frequency is supplied to the charge pump circuit 4. During a period a load current flows, the charge pump circuit 4 receives the voltage detection signal φ1 whose frequency varies depending on the magnitude of the load current. This is because, the rate of lowering of the potential of the boosted output voltage VO1 varies depending on the load current. Thus, the frequency of the voltage detection signal φ1 is higher than that of the clock signal φ2.

Figure 3:
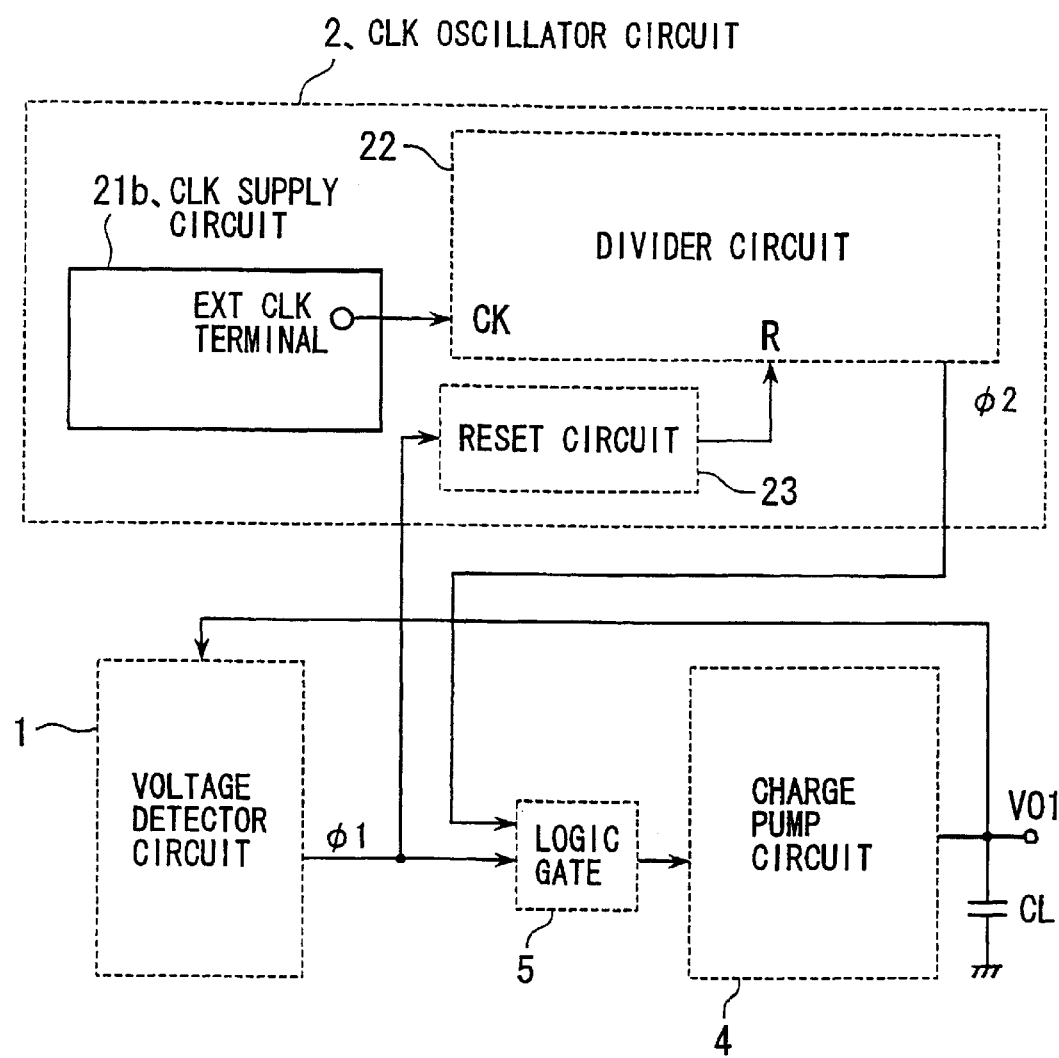
FIG. 3 is a block diagram illustrating a voltage conversion circuit according to the second embodiment of the present invention.

FIG. 3 is a schematic block circuit diagram illustrating a voltage conversion circuit according to the second embodiment of the present invention. As shown in FIG. 3, the second embodiment differs from the first embodiment in that, in the second embodiment, a clock supply circuit 21b is not formed on the same semiconductor substrate as that of the other circuits.

In this embodiment, it is possible to supply a clock signal from outside. For example, the clock supply circuit 21b in this embodiment can be a crystal oscillator disposed outside. As mentioned above with reference to FIG. 1, when the divided voltage VO2 of the boosted output voltage VO1 becomes higher than the reference voltage VR1 and supply of the clock signal φ2 to the charge pump circuit 4 is stopped, it is possible for the clock supply circuit 21b to maintain an oscillated condition. Therefore, the clock signal supplied to the divider circuit 22 can be supplied from the crystal oscillator disposed outside the semiconductor substrate.

Other circuit structure and operation of the second embodiment is the same as that of the first embodiment, and detailed explanation thereof is omitted here.

Figure 4:
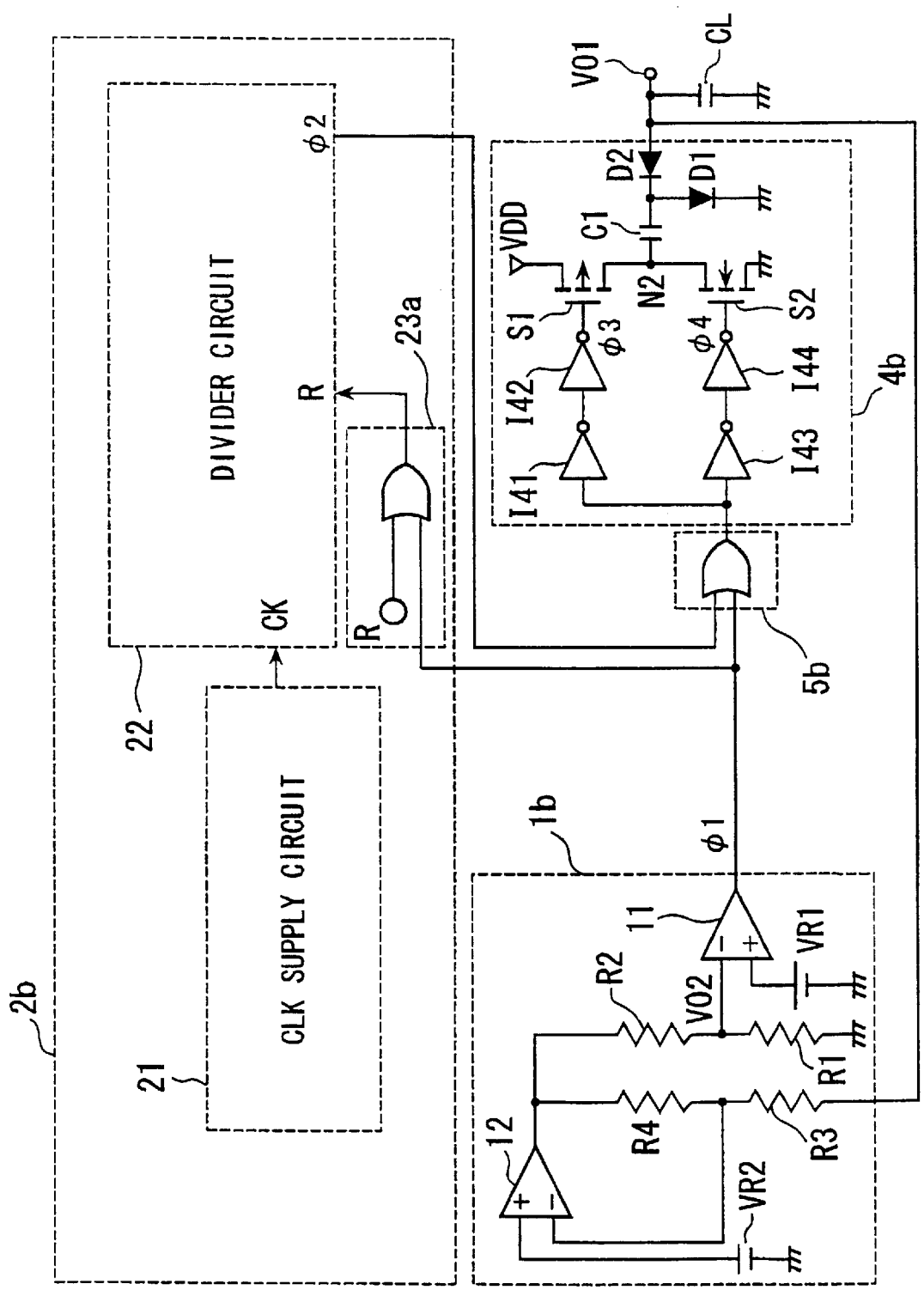
FIG. 4 is a circuit diagram illustrating a voltage conversion circuit according to the third embodiment of the present invention.

FIG. 4 is a schematic block circuit diagram illustrating a voltage conversion circuit according to the third embodiment of the present invention. As shown in FIG. 4, the voltage conversion circuit according to this embodiment comprises a charge pump circuit producing a negative boosted output voltage VO1. That is, the voltage conversion circuit of FIG. 4 includes a voltage detector circuit 1b, a clock oscillator circuit 2b, a logic gate 5b, a charge pump circuit 4b, and a compensation capacitor CL. The voltage detector circuit 1b is a circuit which compares a divided output voltage VO2, obtained based on a boosted output voltage VO1, with a reference voltage VR1, and outputs a voltage detection signal φ1 depending on the result of the comparison. The clock oscillator circuit 2b performs controlled oscillation operation in response to the voltage detection signal φ1, and outputs a clock signal φ2. The logic gate 5b controls a transfer of the clock signal φ2 outputted from the clock oscillator circuit 2b in response to the voltage detection signal φ1 from the voltage detector circuit 1b. The charge pump circuit 4b charges capacitor C1 in response to the output signal of the logic circuit 5b, and produces the boosted output voltage VO1. The compensation capacitor CL is coupled between the output terminal and the ground.

The voltage detector circuit 1b in this embodiment comprises a comparator 11, reference voltage sources VR1 and VR2, an operational amplifier 12, and resistors R1 through R4 for dividing the boosted output voltage VO1 and producing the divided voltage VO2. The resistors R1 and R2 are serially coupled between the output of the operational amplifier 12 and the ground, and the connection node between the resistor R1 and the resistor R2 is coupled to an inverting input (−side) of the comparator 11. A non-inverting input (+side) of the comparator 11 is coupled with the reference voltage VR1. A non-inverting input (+side) of the operational amplifier 12 is coupled with the reference voltage VR2. The resistors R4 and R3 are serially coupled between the output of the operational amplifier 12 and the output terminal for the boosted output voltage VO1, and the connection node between the resistor R4 and the resistor R3 is coupled to an inverting input (−side) of the operational amplifier 12. It is also possible to supply the reference voltage VR2 coupled to the non-inverting input of the operational amplifier 12 from a stable power source outside the semiconductor substrate. However, it is preferable that the reference voltage VR2 is supplied from a stabilized power source such as a bandgap referenced circuit and the like integrated on the same semiconductor substrate.

The clock oscillator circuit 2b comprises a clock supply circuit 21, a divider circuit 22 and a reset circuit 23a. The clock oscillator circuit 2b may differ from the clock oscillator circuit 2 of the first embodiment only in the structure of the reset circuit 23a. In the reset circuit 23a, an input of a voltage detection signal φ1 is not inverted. Therefore, a detailed explanation of the clock oscillator circuit 2b is not repeated here.

The logic gate 5b as a transfer circuit comprises an OR circuit which receives as inputs the voltage detection signal φ1 of the voltage detector circuit 1b and a clock signal φ2 that is an output of the clock generating circuit 2b. An output signal of the OR circuit, that is, an output signal of the logic gate 5b, is supplied to the charge pump circuit 4b. The logic gate 5b differs from the logic gate 5 of FIG. 1 in that, in the logic gate 5b, an input of the voltage detection signal φ1 is not inverted.

The charge pump circuit 4b comprises inverters I41–I44, and a first switch S1 and a second switch S2 serially coupled between a power supply voltage VDD and the ground. The charge pump circuit 4b further comprises a capacitor C1 whose one terminal is coupled to a common connection node of the switches S1 and S2, and diodes D1 and D2. The diode D1 is coupled between the other terminal of the capacitor C1 and the ground, and the diode D2 is coupled between the other terminal of the capacitor C1 and the output terminal VO1 from which the boosted output voltage VO1 is outputted. The charge pump circuit 4b differs from the charge pump circuit 4 of the first embodiment in the location and direction of connection of the diodes D1 and D2. Other structure of the charge pump circuit 4b is the same as that of the charge pump circuit 4 of the first embodiment. In a manner similar to the first embodiment, it is possible to form these diodes D1 and D2 by using MOS transistors similarly to the switches S1 and S2.

Now, a schematic explanation will be made on an operation of the above-mentioned voltage conversion circuit.

First, when the power supply is turned on, the reset circuit 23a receives the reset signal R from, for example, a power-on reset circuit, a power supply monitor circuit and the like formed on the same semiconductor substrate not shown in the drawing. In response to the reset signal R, the reset circuit 23a initializes the counter circuit, that is, divider circuit 22 comprising the D-type flip-flops (see FIG. 1).

Here, when the divided voltage VO2 is lower than the reference voltage VR1, the voltage detection signal φ1 of the voltage detector circuit 1b becomes logically high, and on the other hand, when the divided voltage VO2 is higher than the reference voltage VR1, the voltage detection signal φ1 of the voltage detector circuit 1a becomes logically low. When the voltage detection signal φ1 is in a low potential level, the reset circuit 23a outputs a low level signal. Thus, the reset condition of the divider circuit 22 is released, and the logic gate 5b as a transfer circuit allows the clock signal φ2 to pass to the charge pump circuit 4b. The counter circuit of the divider circuit 22 divides the first clock signal produced by the clock supply circuit 21 by eight, and starts to supply the clock signal φ2 to the charge pump circuit 4b.

On the other hand, the charge pump circuit 4b produces the clock signals φ3 and φ4 from the clock signal φ2 by the inverters I41–I44, and supplies the clock signals φ3 and φ4 to the switches S1 and S2, respectively. Duty cycles of the clock signals φ3 and φ4 are respectively adjusted by slightly changing the threshold levels of the inverters I41–I44 such that the switches S1 and S2 do not turn on simultaneously. During time periods in which these clock signals φ3 and φ4 are logically low, the switch S1 is in a turned-on condition, and the switch S2 is in a turned-off condition. In such condition, the capacitor C1 is charged approximately to the power supply voltage VDD. During time periods in which these clock signals φ3 and φ4 are logically high, the switch S1 is in a turned-off condition, and the switch S2 is in a turned-on condition. In such condition, one of the terminals of the capacitor C1, that is, a node N2, is coupled to the ground. Thereby, the compensation capacitor CL is charged to a voltage lower than−VDD and, therefore, the boosted output voltage VO1 having a voltage lower than−VDD is outputted.

In this way, the charge pump circuit 4b performs a voltage boost operation, and when the divided voltage VO2 becomes lower than the reference voltage VR1, that is, when the detection signal output φ1 becomes high, the reset circuit 23a outputs a logically high output signal and resets the divider circuit 22. Also, the logic gate 5b as a transfer circuit inhibits the clock signal φ2 from being supplied to the charge pump circuit 4b.

By the operation mentioned above, the charge pump circuit 4b outputs the boosted output voltage VO1 on the basis of the reference voltage VR1. The charge pump circuit 4 can output the boosted output voltage VO1 having a negative potential level whose absolute value is between one and two times of the potential level of the power supply voltage VDD.

Also, in this embodiment, the reference voltages VR1 and VR2 are constituted by using the bandgap reference type circuits which have little dependence on the temperature and the power supply voltage VDD. Therefore, variation of the boosted output voltage VO1 caused by the variation of the power supply voltage can be very small.

The above-mentioned voltage conversion circuit of the third embodiment can be modified in a manner similar to that of the second embodiment. That is, the clock supply circuit 21 is not formed on the same semiconductor substrate as that of other circuits such as the divider circuit 22 and the like, and it is possible to supply a clock signal from outside. For example, the clock supply circuit 21 can be a crystal oscillator disposed outside of other circuits.

As a practical example, in the above-mentioned third embodiment shown in FIG. 4, it is possible to use the capacitor C1 of 4.7 μF and the compensation capacitor CL of 4.7 μF. An oscillation frequency of the clock signal supplied to the charge pump circuit 4b can be 500 kHz, and the power supply voltage VDD can be 5V. In such case, it is possible to obtain the boosted output voltage VO1 of −3V whose voltage ripple is approximately +/−25 mV. Such small ripple voltage can be realized by using a smaller number of components than that of the conventional voltage conversion circuit.

As mentioned above, in the voltage conversion circuit according to the present invention, it is possible to decrease the number of components, by using the non-complementary type charge pump circuit.

Also, in the present invention, when the voltage detector circuit detects that the divided voltage determined based on the boosted output voltage has become lower than the reference voltage, the clock signal is produced such that the charge pump circuit always starts operation from the voltage boost sequence. Therefore, even when the voltage conversion circuit according to the present embodiment is composed by using the non-complementary type charge pump circuit, it is possible to reduce ripple voltage components appearing on the boosted output voltage.

Further, according to the present invention, it is possible to produce the reference voltages by using the bandgap reference type circuits which have little dependence on the temperature and the power supply voltage. Therefore, variations of the potential level of the power supply voltage give little influence on the potential level of the boosted output voltage.

Still further, in the present invention, it is not necessary to clamp the potential of each node of the clock oscillator circuit when the voltage detector circuit detects that the divided voltage of the boosted output voltage has become higher than the reference voltage. In the present invention, when the voltage detector circuit detects that the divided voltage of the boosted output voltage has become lower than the reference voltage, it is possible to produce the clock signal which cause the charge pump circuit to always start operation from the voltage boost operation. Therefore, it is not always necessary to build the clock supply circuit, such as a ring oscillator and the like, onto a semiconductor substrate. Thus, it is possible to decrease a chip area of the voltage conversion circuit, to improve a precision of a frequency of the clock signal with respect to a power supply voltage, temperature and the like, and to decrease power consumption.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A voltage conversion circuit comprising:
    a voltage detector means which detects whether a boosted output voltage of said voltage conversion circuit is larger or smaller than a predetermined reference voltage;
    a clock generating means which generates a clock signal based on the result of detection by said voltage detector means;
    a charge-pump type voltage conversion means which produces said boosted output voltage in response to said clock signal; and
    a transfer control means which allows or inhibits transfer of said clock signal to said voltage conversion means depending on the result of a detection by said voltage detector means;
    wherein said transfer control means comprises a logic gate which receives said clock signal and a voltage detection signal showing the result of detection of said voltage detector means;
    wherein, when the condition of said transfer control means is changed from the inhibited condition to be allowed condition based on said clock signal outputted from said clock generating means, an operation of said voltage conversion means starts from a voltage boost sequence.

2. A voltage conversion circuit as set forth in claim 1, wherein said logic gate is an OR gate.

3. A voltage conversion comprising:
    a voltage detector means which detects whether a boosted output voltage of said voltage conversion circuit is larger or smaller than a predetermined reference voltage;
    a clock generating means which generates a clock signal based on the result of detection by said voltage detector means;
    wherein said clock generating means comprises a divider circuit which divides an input clock signal supplied thereto and which is resettable based on said voltage detection signal from said voltage detector circuit;
    a charge-pump type voltage conversion means which produced said boosted output voltage in response to said clock signal; and
    a transfer control means which allows or inhibits transfer of said clock signal to said voltage conversion means depending on the result of detection by said voltage detector means;
    wherein, when the condition of said transfer control means is changed from the inhibited condition to be allowed condition based on said clock signal outputted from said clock generating means, an operation of said voltage conversion means starts from a voltage boost sequence.

4. A voltage conversion circuit comprising:
- a voltage detector circuit which detects whether a boosted output voltage of said voltage conversion circuit is larger or smaller than a predetermined reference voltage and which outputs a voltage detection signal depending on the result of detection;
- a clock oscillator circuit which has a divider circuit for dividing a first clock signal inputted thereto to generate a second clock signal and which has a reset circuit for resetting said divider circuit based on said voltage detection signal from said voltage detector circuit;
- a logic gate which perform logical operation of said second clock signal from said clock oscillator circuit and said voltage detection signal from said voltage detector circuit; and
- a charge-pump circuit which comprises a capacitor and switch circuit for charging said capacitor based on an output of said logic gate and which produces said boosted output voltage.

5. A voltage conversion circuit as set forth in claim 4, wherein, when said boosted output voltage of said voltage conversion circuit becomes larger than said predetermined reference voltage, said charge pump circuit starts operation from a voltage boost sequence.

6. A voltage conversion circuit as set forth in claim 5, wherein said logic gate is an OR gate.

7. A voltage conversion circuit as set forth in claim 4, wherein said first clock signal is supplied by a clock supply circuit comprising an odd number of inverters coupled to form a ring oscillator and a buffer circuit coupled to the output of said ring oscillator.

8. A voltage conversion circuit as set forth in claim 4, wherein said divider circuit comprises a plurality of tandem coupled flip-flops which count said first clock signal to generate said second clock signal and which are resettable by said reset circuit.

9. A voltage conversion circuit as set forth in claim 4, wherein said reset circuit resets said divider circuit based on an external reset signal or on said voltage detection signal from said voltage detector circuit.

10. A voltage conversion circuit as set forth in claim 4, wherein said charge pump circuit is a non-complementary type charge pump circuit.

11. A voltage conversion circuit as set forth in claim 4, wherein said voltage detector circuit comprises a comparator and a voltage divider circuit, said comparator receiving a divided voltage from said voltage divider circuit and a reference voltage supplied by a bandgap reference circuit.

12. A voltage conversion circuit as set forth in claim 4, wherein said voltage detector circuit comprises a comparator, an operational amplifier and a voltage divider circuit for dividing an output signal of said operational amplifier and supplying a divided voltage from said voltage divider circuit to an input of said comparator, said comparator and said operational amplifier receiving reference voltages each supplied by a bandgap reference circuit.

13. A voltage conversion circuit as set forth in claim 4, wherein said first clock signal is supplied to said clock oscillator circuit by a clock supply circuit disposed outside of a semiconductor integrated circuit including at least a portion of said voltage conversion circuit.

14. A voltage conversion circuit as set forth in claim 4, wherein said first clock signal is supplied to said clock oscillator circuit by a clock supply circuit integrated on a semiconductor substrate including at least a portion of said voltage conversion circuit.

* * * * *